United States Patent [19]
Gellert

[11] Patent Number: 5,269,676
[45] Date of Patent: Dec. 14, 1993

[54] INJECTION MOLDING NOZZLE INSERT

[76] Inventor: Gellert U. Jobst, 233 Armstrong Avenue, Georgetown, Ontario, Canada, L7G 4X5

[21] Appl. No.: 933,817

[22] Filed: Aug. 24, 1992

[30] Foreign Application Priority Data

Jul. 27, 1992 [CA] Canada ............................ 2,074,694-7

[51] Int. Cl.⁵ .............................................. B29C 45/20
[52] U.S. Cl. ..................... 425/549; 425/568; 425/570; 264/378.15
[58] Field of Search ............... 425/549, 568, 570, 562, 425/563, 564, 565, 566; 264/328.15

[56] References Cited

U.S. PATENT DOCUMENTS

| | | | |
|---|---|---|---|
| 4,663,811 | 5/1987 | Gellert | 425/549 |
| 5,049,062 | 9/1991 | Gellert | 425/549 |
| 5,118,279 | 6/1992 | Gellert | 425/549 |

Primary Examiner—Tim Heitbrink
Attorney, Agent, or Firm—Dalesman & Company

[57] ABSTRACT

A seating and sealing insert for mounting a heated injection molding nozzle in a well in a mold. The hollow insert has a cylindrical central portion extending between a rear seating portion and a forward sealing portion. The rear seating portion is outwardly flanged to seat in the well in the mold and forms an inner seat to receive a cylindrical support flange of the nozzle to accurately support the nozzle in the well in the mold. The forward sealing portion has a V - shaped forward face and inner and outer surfaces which are forced outwardly by melt pressure to seal against the nozzle and the mold. Thus, the seating and sealing insert provides an insulative air space between the heated nozzle and the surrounding mold and the forward sealing portion prevents the escape of pressurized melt into the insulative air space.

6 Claims, 3 Drawing Sheets

INJECTION MOLDING NOZZLE INSERT

BACKGROUND OF THE INVENTION

This invention relates generally to injection molding and more particularly to a seating and sealing insert for mounting a heated nozzle in a well in a mold.

It is well known in injection molding for a nozzle to be received in a well in a mold with an insulative air space provided between them to minimize surface to surface contact between the heated nozzle and cooled mold to reduce heat loss. It is also well known to provide a seat to accurately locate the nozzle in the well and to provide a seal to prevent pressurized melt escaping into the air space. However, in the past, separate structure has been required to provide both the seating and sealing functions for a nozzle in a mold. For instance, the applicant's U.S. Pat. No. 4,663,811 which issued May 12, 1987 shows the nozzle having a support flange seated against a shoulder in the mold, while sealing is provided by a separate cylindrical seal having a V-shaped forward surface. Similarly, the applicant's U.S. Pat. No. 5,049,062 which issued Sep. 17, 1991 shows the nozzle seat being provided by a gate insert, while the sealing is provided by a sealing and locating flange extending around the nozzle. The applicant's U.S. Pat. No. 5,118,279 which issued Jun. 2, 1992 does show a sleeve which provides both locating and sealing, but it is applicable only to a probe having spaced fins which project outwardly into contact with the sleeve.

SUMMARY OF THE INVENTION

Accordingly, it is an object of the present invention to at least partially overcome the disadvantages of the prior art by providing an insert for mounting an injection molding nozzle in a mold which both seats the nozzle in the mold and seals against the escape of pressurized melt into the insulative air space.

To this end, in one of its aspects, the invention provides an injection molding seating and sealing insert with an opening extending centrally therethrough for mounting a heated nozzle having a support flange in a well in a mold with an insulative air space provided between the nozzle and the mold, the insert comprising a generally cylindrical hollow central portion extending between a hollow rear seating portion and a hollow forward sealing portion, the rear seating portion being outwardly flanged from the central portion to seat in the well in the mold and forming a rearward facing inner shoulder to receive the support flange of the nozzle to accurately support the nozzle in the well in the mold with a portion of the nozzle extending through the central opening in the insert, the sealing portion extending forwardly from the central portion and having a uniform cross section with an inner surface, an outer surface, and a V-shaped forward face extending between the inner surface and the outer surface, the sealing portion bridging the insulative air space between the nozzle and the mold with the inner surface sealing against the nozzle and the outer surface sealing against the mold to prevent melt escaping into the insulative air space.

Further objects and advantages of the invention will appear from the following description taken together with the accompanying drawings.

DETAILED DESCRIPTION OF THE INVENTION

Figure 1:
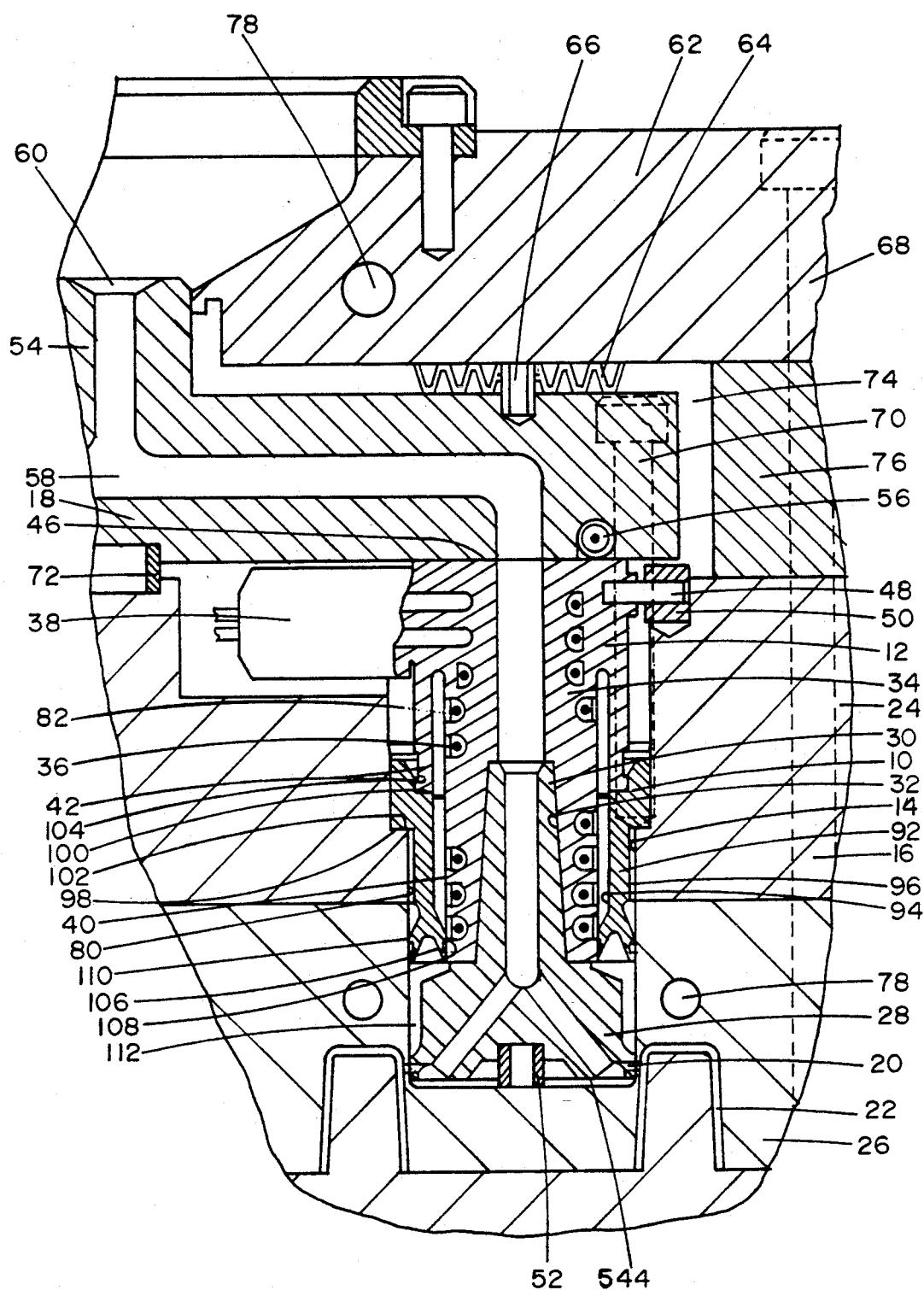
FIG. 1 is a partial sectional view of a portion of a multi-cavity injection molding system having a seating and sealing insert according to a preferred embodiment of the invention.

Reference is first made to FIG. 1 which shows a portion of an edge gated injection molding system showing a seating and sealing insert 10 according to the invention for mounting a heated nozzle 12 in a well 14 in a mold 16. The system shown has a heated steel manifold 18 to distribute melt to several spaced nozzles 12, and each nozzle 12 then distributes the melt to several spaced edge gates 20 leading to different cavities 22. Of course, the seating and sealing insert according to the invention can be used with a wide variety of gating configurations other than the one shown. While, in this case, each well 14 extends through a manifold retainer plate 24 into a cavity plate 26, other arrangements of mold plates can be used for other configurations.

In this arrangement, each nozzle 12 has a forward member 28 with a tapered rear portion 30 which is frictionally received in a matching tapered well 32 in a rear member 34. The nozzle 12 is heated by a helical electrical heating element 36 which is integrally brazed in the rear member 34 and extends to an external terminal 38. The nozzle 12 has an outer surface 40, a support flange 42, a forward end 44, and a rear end 46. A locating pin 48 extends from the nozzle 12 and is secured by a cam 50 to ensure accurate alignment of the nozzle 12. A titanium support spacer 52 is seated between the forward end 44 of the nozzle 12 and the cavity plate 26 to ensure the forward member 28 is retained in place.

The melt distribution manifold 18 has a cylindrical inlet portion 54 and an electrical heating element 56. A melt passage 58 extends from a common inlet 60 in the inlet portion 54 and branches outward to extend through each nozzle 12 where it branches again to each gate 20. The manifold 18 is mounted between the manifold retainer plate 24 and a steel back plate 62. Insulative and resilient spacer members 64 are located between the manifold 18 and the back plate 62 by pins 66. Bolts 68 which extend through the mold plates to hold them together apply a force through the spacer members 64 to hold the manifold 18 and nozzles 12 securely in this position. Bolts 70 which extend from the manifold 18 into the mold also secure the manifold 18 tightly against the rear ends 46 of the nozzle 12. A central locating ring 72 is seated between the manifold 18 and the manifold retainer plate 24 to accurately locate the manifold in place. This provides an insulative air space 74 between the heated manifold 18 and the adjacent manifold retainer plate 24, spacer plate 76, and back plate 62 which are cooled by pumping water through cooling conduits 78.

Figure 2:
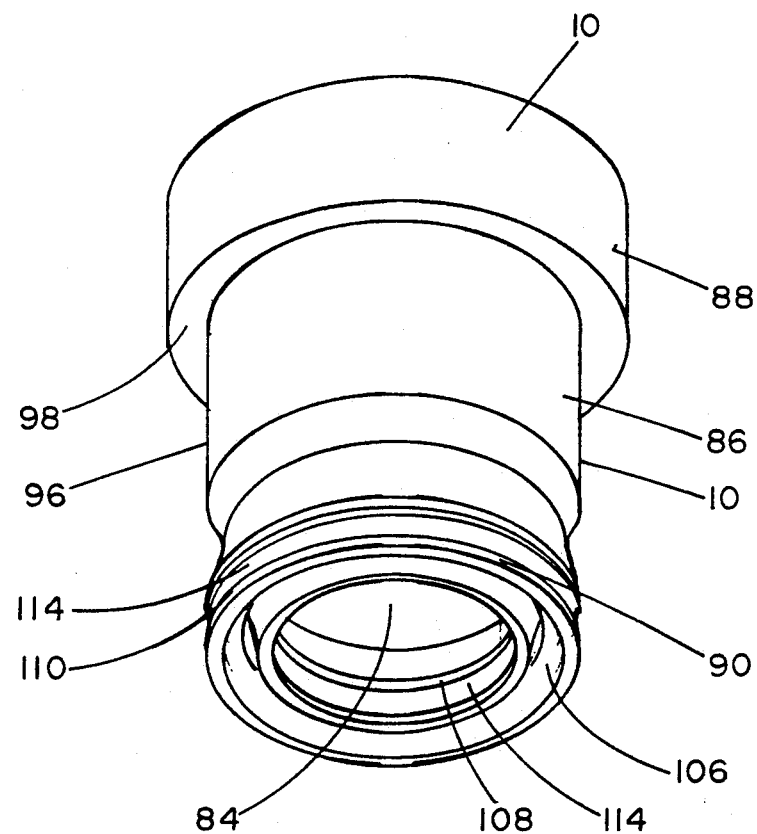
FIG. 2 is an isometric view of the seating and sealing insert seen in FIG. 1.
Figure 3:
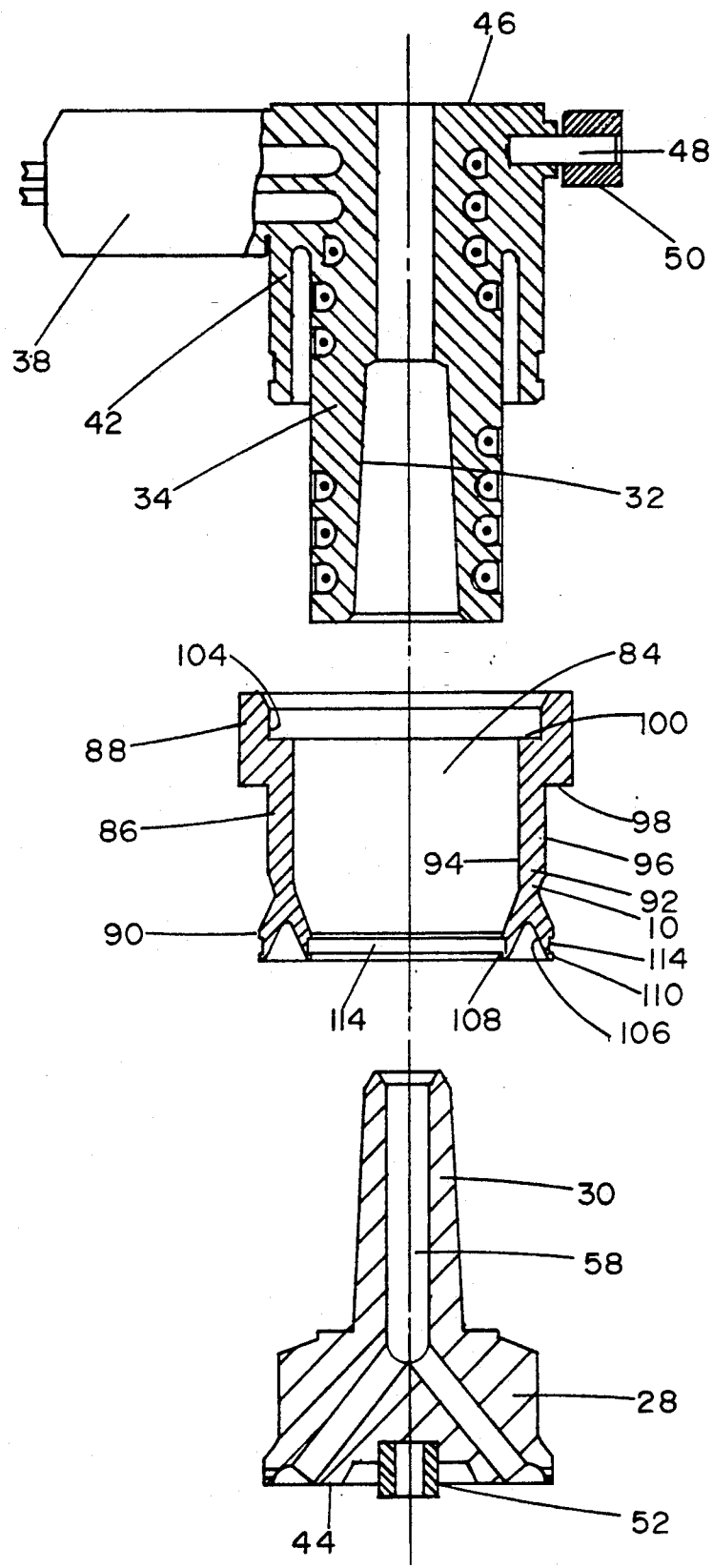
FIG. 3 is a sectional view showing the seating and sealing insert in position for assembly between the rear and forward members of the nozzle.

The outer surface 40 of each nozzle 12 and the surrounding inner surface 80 of the well 14 are shaped to receive the seating and sealing insert 10 according to the invention and form another insulative air space 82 between them to provide further thermal separation by minimizing steel to steel contact between the heated and cooled components of the system. As also seen in FIG. 2, the insert 10, which is made of steel, is hollow and has a central opening 84 to receive the nozzle 12 therethrough. The insert 10 has a hollow cylindrical central portion 86 extending between a hollow rear seating portion 88 and a hollow forward sealing portion 90. The central portion 86 has a cylindrical wall 92 with an inner surface 94 and an outer surface 96. The rear seating portion 88 of the insert is outwardly flanged from the central portion 86 to form a circular forward facing outer shoulder 98 and a circular rearward facing inner shoulder 100. The outer shoulder 98 seats against a matching rearwardly facing circular shoulder 102 in the well 14 of the mold 16. The rear seating portion 88 extends rearwardly around the rearward facing inner shoulder 100 to form a cylindrical seat 104 in which the cylindrical support flange 42 of the nozzle 12 is received. Thus, as clearly seen in FIG. 1, the real seating portion 88 of the insert 10 accurately supports the nozzle 12 in the well 14 in the mold 16 with a portion of the nozzle 12 extending through the central opening 84 in the insert 10. The sealing portion 90 of the insert 10 extends forwardly from the cylindrical central portion 86 and has a uniform cross section with a V - shaped forward face 106 extending between an inner surface 108 and an outer surface 110. The forward sealing portion 90 is wider than the central portion 86 so the insulative air space 82 extends on both sides of the central portion 86. Thus the forward portion 90 extends inwardly from the inner surface 94 of the cylindrical wall 92 of the central portion 86 to the inner surface 108 which seals against the outer surface 40 of the nozzle 12. Similarly, the forward portion 90 extends outwardly from the outer surface 96 of the cylindrical wall 92 of the central portion 86 to the outer surface 110 which seals against the inner surface 80 of the well 14 in the surrounding mold 16. Thus the forward portion 90 of the insert 10 bridges the insulative air space 82 to prevent pressurized melt from escaping from the area 112 around the forward member 28 of the nozzle 12 into the insulative air space 82 around the rear member 34 of the nozzle 12. As best seen in FIG. 3, in this embodiment, the inner and outer sealing surfaces 108, 110 of the forward portion 90 have small circumferential insulative grooves 114 to further reduce steel to steel contact.

In this embodiment, the well 14 in the mold 16 has a substantially uniform diameter from the gates 20 rearwardly to the rearward facing circular shoulder 102 and the outer diameter of the forward member 28 of the nozzle 12 is considerably greater than the inner diameter of the insert 10. Thus, as seen in FIG. 3, the seating and sealing insert 10 must be positioned between the forward and rear members 28, 34 of the nozzle 12 before they are fitted together and mounted in the well 14 in the mold 16. Of course, in other embodiments, the insert 10, nozzle 12 and mold 16 can have other configurations and dimensions where this is not required.

In use, the injection molding system is assembled as shown in FIG. 1. Electrical power is applied to the heating element 56 in the manifold 18 and to the heating elements 36 in the nozzles 12 to heat them to a predetermined operating temperature. Pressurized melt from a molding machine (not shown) is then injected into the melt passage 58 through the common inlet 60 according to a predetermined cycle in a conventional manner. In this embodiment, the pressurized melt branches first in the manifold 18 and then in each nozzle 12 to the edge gates 20 to fill the cavities 22. The pressure of the melt against the V -shaped face 106 of the forward sealing portion 90 of the insert 10 forces the inner and outer surfaces 108, 110 into sealing contact against the nozzle 12 and the mold 16. After the cavities 22 are filled, injection pressure is held momentarily to pack and then released. After a short cooling period, the mold is opened to eject the molded products. After ejection, the mold is closed and injection pressure is reapplied to refill the cavities 22. This cycle is continuously repeated with a frequency dependent on the size and shape of the cavities and the type of material being molded.

While the description of the inserts 10 has been given with respect to a preferred embodiment, it will be evident that various modifications are possible without departing from the scope of the invention as understood by those skilled in the art and as defined in the following claims.

The embodiments of the invention in which an exclusive property or privilege is claimed are defined as follows:

1. An injection molding seating and sealing insert with an opening extending centrally therethrough for mounting a heated nozzle having a support flange in a well in a mold with an insulative air space provided between the nozzle and the mold, the insert comprising a generally cylindrical hollow central portion extending between a hollow rear seating portion and a hollow forward sealing portion, the rear seating portion being outwardly flanged from the central portion to seat in the well in the mold and forming a rearward facing inner shoulder to receive the support flange of the nozzle to accurately support the nozzle in the well in the mold with a portion of the nozzle extending through the central opening in the insert, the sealing portion extending forwardly from the central portion and having a uniform cross section with an inner surface, an outer surface, and a V - shaped forward face extending between the inner surface and the outer surface, the sealing portion bridging the insulative air space between the nozzle and the mold with the inner surface sealing against the nozzle and the outer surface sealing against the mold to prevent melt escaping into the insulative air space.

2. An injection molding seating and sealing insert as claimed in claim 1 wherein the rear seating portion extends rearwardly around the rearward facing inner shoulder to form a cylindrical seat in which the support flange of the nozzle is received.

3. An injection molding seating and sealing insert as claimed in claim 2 wherein the flanged rear seating portion forms a circular forward facing outer shoulder to seat against a matching rearward facing shoulder in the well in the mold.

4. An injection molding seating and sealing insert as claimed in claim 3 wherein the hollow central portion has a cylindrical wall with an inner surface and an outer surface, the inner surface of the forward sealing portion being a predetermined distance inward from the inner surface of the wall, and the outer surface of the forward sealing portion being a predetermined distance outward from the outer surface of the wall.

5. An injection molding seating and sealing insert as claimed in claim 4 wherein at least one of the inner and outer surfaces of the forward sealing portion has an insulative groove extending therearound.

6. An injection molding seating and sealing insert as claimed in claim 4 formed of steel.

* * * * *